(12) United States Patent
Drewett et al.

(10) Patent No.: US 11,425,471 B2
(45) Date of Patent: Aug. 23, 2022

(54) WIRELESS SENSING APPARATUS AND METHOD

(71) Applicant: Senceive LTD, London (GB)

(72) Inventors: Thomas Anthony Drewett, London (GB); Bryn Anthony Smith, London (GB); Christopher Piers Nigel West, London (GB)

(73) Assignee: Senceive LTD, London (GB)

( * ) Notice: Subject to any disclaimer, the term of this patent is extended or adjusted under 35 U.S.C. 154(b) by 0 days.

(21) Appl. No.: 16/492,869

(22) PCT Filed: Mar. 14, 2018

(86) PCT No.: PCT/GB2018/050646
§ 371 (c)(1),
(2) Date: Sep. 10, 2019

(87) PCT Pub. No.: WO2018/167482
PCT Pub. Date: Sep. 20, 2018

(65) Prior Publication Data
US 2020/0068277 A1 Feb. 27, 2020

(30) Foreign Application Priority Data
Mar. 15, 2017 (GB) .................. 1704124.5

(51) Int. Cl.
*H04Q 9/00* (2006.01)
*H04B 5/00* (2006.01)

(52) U.S. Cl.
CPC ............ *H04Q 9/00* (2013.01); *H04B 5/0031* (2013.01); *H04Q 2209/40* (2013.01); *H04Q 2209/883* (2013.01)

(58) Field of Classification Search
CPC .. H04Q 9/00; H04Q 2209/00; H04Q 2209/10; H04Q 2209/40; H04Q 2209/50; H04Q 2209/80; H04Q 2209/82; H04Q 2209/823; H04Q 2209/883; H04B 5/0031
See application file for complete search history.

(56) References Cited

U.S. PATENT DOCUMENTS

| | | | | |
|---|---|---|---|---|
| 7,366,614 B2 * | 4/2008 | Roy | ......................... | G01W 1/00 702/3 |
| 9,127,964 B2 * | 9/2015 | Schwarz | ................. | G08G 1/017 |
| 9,913,642 B2 * | 3/2018 | Leimbach | ............... | A61B 90/96 |
| 9,986,313 B2 * | 5/2018 | Schwarzkopf | ........... | H04Q 9/00 |
| 10,291,292 B2 * | 5/2019 | Rumler | .................. | G05B 15/02 |
| 10,728,694 B2 * | 7/2020 | Yu | ........................... | G01S 11/12 |

(Continued)

*Primary Examiner* — Franklin D Balseca
(74) *Attorney, Agent, or Firm* — John L. Rogitz; John M. Rogitz

(57) ABSTRACT

The present invention relates to a wireless sensing apparatus 100. A wireless sensing apparatus 100 comprises a housing 200 containing one or more sensor devices 120A, 120B each configured to detect an environmental attribute in the vicinity of that sensor device, wireless communication circuitry 130 configured to transmit telemetry data from the one or more sensor devices 120A, 120B, and Near Field Communications (NFC) circuitry 140 configured to receive configuration data for the wireless sensing apparatus from an external device. The wireless sensing apparatus may be used for detecting an environmental attribute of a structure, such as a tunnel or building.

15 Claims, 6 Drawing Sheets

(56) References Cited

U.S. PATENT DOCUMENTS

| | | | |
|---|---|---|---|
| 2006/0080850 A1* | 4/2006 | Firth | B23D 59/003 33/286 |
| 2008/0165001 A1* | 7/2008 | Drake | G08B 29/24 340/550 |
| 2010/0302009 A1* | 12/2010 | Hoeksel | G01D 21/00 340/10.1 |
| 2015/0130637 A1* | 5/2015 | Sengstaken, Jr. | G08C 17/02 340/870.16 |
| 2017/0181628 A1* | 6/2017 | Burnette | A61B 5/7282 |

* cited by examiner

WIRELESS SENSING APPARATUS AND METHOD

FIELD OF THE INVENTION

The present invention relates to a wireless sensing apparatus and method.

BACKGROUND OF THE INVENTION

The construction industry uses a variety of instrumentation to perform monitoring of structures such as tunnels, bridges, buildings and so on. Such instrumentation typically comprises sensor devices that are rigidly attached, for example by screws, to a structure to be monitored. In many situations, the monitoring is performed at locations that do not have a pre-existing or at least a readily accessible wired infrastructure for providing power and for supporting data communications to/from the sensors. In these circumstances, it is attractive for the sensors to use wireless communications and to be battery-powered devices.

Some existing wireless, battery powered sensing devices have a high degree of weatherproofing (such as adhering to ingress protection standards IP66 or IP68), the integrity of which will be reduced or compromised if the enclosures could be unsealed and resealed. Consequently, such battery powered sensing apparatuses cannot be easily configured or re-configured once they are installed on-site. In order to re-configure the sensor devices for a new installation, they must be sent back to the manufacturer or supplier.

Another problem with existing wireless, battery powered sensing apparatuses is that, once they are installed on-site, there is no way of replacing or charging the battery. Once the charge in the battery is depleted, the wireless sensing apparatuses will no longer have enough power to generate and record data. Wireless sensing apparatuses must therefore be replaced periodically in order to maintain monitoring capability in a given location.

Furthermore, even if a sensing device could be opened for changing the battery or re-configuration, this may represent a relatively time consuming task. Therefore, it is often difficult to perform such operations within the limited time available in an on-site location (for example, during the period when trains are not running on a track).

SUMMARY OF THE INVENTION

One embodiment of the invention provides a wireless sensing apparatus comprising: a housing containing one or more sensor devices each configured to detect an environmental attribute in the vicinity of that sensor device, wireless communication circuitry configured to transmit telemetry data from the one or more sensor devices, and Near Field Communications (NFC) circuitry configured to receive configuration data for the wireless sensing apparatus from an external device. The NFC circuitry provides a means of configuring the wireless sensing apparatus whilst it is installed on-site.

In some embodiments, the housing also contains a processor unit configured to control the operation of the wireless sensing apparatus and a battery configured to supply power to at least the one or more sensor devices, the wireless communication circuitry and the processor unit. The processor unit and the battery allow the wireless sensing apparatus to be a self-contained unit, removing the need for any wired communications or external power sources.

In some embodiments the NFC circuitry further comprises an NFC controller comprising a memory and a processor, and an NFC antenna. This allows the NFC circuitry to be controlled independently from the rest of the wireless sensing apparatus.

In some embodiments, in response to receiving a signal from the external device via the NFC antenna, the NFC controller is configured to cooperate with the processor unit to change the wireless sensing apparatus from a first mode of operation to a second mode of operation. This allows the operation of the wireless sensing apparatus to be controlled and changed by an external device while the wireless sensing apparatus is installed on-site.

In some embodiments one of the first or the second mode of operation is a normal operation mode in which the wireless communication circuitry and the one or more sensor devices are enabled, and the other of the first or the second mode of operation is a low power mode, the low power mode having a lower power consumption than the normal operation mode. This can reduce the power consumption of the wireless communication circuitry, increasing the battery life.

In some embodiments the one or more sensor devices and the wireless communication circuitry are disabled when the wireless sensing apparatus is in the low power mode. This means the wireless sensing apparatus can be left for potentially long periods of time without draining the battery, for example in storage when the wireless sensing apparatus is not required for detecting environmental attributes.

In some embodiments the wireless sensing apparatus comprises at least two sensor devices, wherein a first one of the at least two sensor devices has a lower operating current draw than a second one of the at least two sensor devices, the first one of the at least two sensor devices is configured to remain enabled when the wireless sensing apparatus is configured in the low power mode, and the wireless communication circuitry and the second one of the at least two sensor devices are disabled when the wireless sensing apparatus is in the low power mode. This allows the wireless sensing apparatus to continue to detect an environmental attribute whilst potentially prolonging the functional life of the wireless sensing apparatus.

In some embodiments the wireless sensing apparatus is configured to change from the low power mode to the normal operating mode in response to the first one of the at least two sensor devices making a detection indicative of one or both of: a change of at least a predetermined magnitude in the environmental attribute detected by that sensor device, and a predetermined attribute value of the environmental attribute detected by that sensor device. This allows the wireless sensing apparatus to automatically change to the normal operation mode, where the second sensor device and wireless communication circuitry are enabled, in response to the first sensor device detecting a change in environmental attribute or a predetermined attribute value.

In some embodiments the wireless sensing apparatus comprises power control circuitry configured to enable and disable the wireless communication circuitry and the one or more sensor devices by selectively providing power to that component. This allows the change in operation mode between the normal operation mode and the low power mode to be controlled by the wireless sensing apparatus.

In some embodiments the power control circuitry is configured, under the control of the processor unit, to initiate a move from the normal operation mode to the low power mode, and the power control circuitry is configured, under the control of the NFC controller, to initiate a move from low power mode to the normal operating mode. This allows the wireless sensing apparatus to change the operation mode between the normal operation mode and the low power mode regardless of which components are currently enabled.

In some embodiments the (non-volatile) memory of the NFC controller is configured to store data such as a most recent sample(s) of the environmental attribute from any sensor device(s) in the apparatus, configuration data for the wireless sensing apparatus, identification information for the wireless sensing apparatus, and a most recent detection of the state of the battery. This allows data to be maintained when the battery is exhausted.

In some embodiments the NFC controller is also configured to transmit, via the NFC antenna, data stored on the memory of the NFC controller to the external device in response to a request from the external device. This allows data to be retrieved from the wireless sensing apparatus when the battery is exhausted.

In some embodiments the wireless communications circuitry, the one or more sensor devices, the processor unit, the wireless communications circuitry and the NFC controller are disposed on a first Printed Circuit Board (PCB) assembly and the wireless communication antenna and the NFC antenna are disposed on a second PCB assembly. This means the sensor devices can be securely mounted to a portion of the housing to ensure accurate and reliable telemetry data is obtained whilst the wireless communication antenna and the NFC antenna can be placed in the best location within the housing to provide reliable telemetry and configuration data transmission.

In some embodiments the battery is disposed between or below the first and second PCB assemblies. This can reduce the volume required inside the housing for the components of the wireless sensing apparatus, whilst reducing shielding of the NFC antenna and wireless communications circuitry.

In some embodiments the second PCB assembly is formed of two interconnected PCBs mounted perpendicular to each other. This reduces the volume required for the second PCB assembly, thereby allowing it to be placed in a smaller housing.

In some embodiments one of the interconnected PCBs forming the second PCB assembly provides a ground plane for the wireless communication antenna. This improves the performance of the antenna whilst also inhibiting interference from the battery and components on the first PCB assembly.

In some embodiments the NFC antenna comprises an induction coil disposed around a periphery of the one of the interconnected PCBs which provides the ground plane for the antenna of the wireless communication circuitry. This provides the largest diameter of induction coil for the NFC antenna possible whilst also reducing interference between the NFC antenna and the antenna of the wireless communication circuitry.

In some embodiments the environmental attribute comprises an attribute of a structure, and the wireless sensing apparatus also comprises a fixing for attaching the housing to a surface of the structure. This allows the wireless sensing apparatus to be mounted to a surface, for example the inside of a tunnel.

In some embodiments the one or more sensor devices comprise one or more selected from the list consisting of: (i) tilt sensors, (ii) temperature sensors, (iii) crack sensors, (iv) noise sensors, (v) pressure sensors, (vi) light sensors, (vii) radiation sensors, (viii) vibration sensors, (ix) air flow sensors, (x) speed sensors, (xi) chemical sensors, (xii) current sensors, (xiii) voltage sensors, (xiv) position sensors, (xv) displacement sensors, (xvi) torque sensors, (xvii) proximity sensors, (xviii) force sensors, and (xix) humidity sensors. This allows a variety of different environmental attributes to be detected by the same wireless sensing apparatus.

In some embodiments the one or more sensor devices are the same. This allows the same environmental attribute to be detected by the one or more sensor device.

In some embodiments the one or more sensor devices are tilt sensors. This allows the inclination or change in inclination of the structure to be detected.

A second embodiment of the present invention provides a wireless sensing method comprising: one or more sensor devices detecting an environmental attribute in the vicinity of that sensor device; wireless communication circuitry transmitting telemetry data from the one or more environment sensors; and Near Field Communications (NFC) circuitry receiving configuration data for the sensor device from an external device.

A third embodiment of the present invention provides computer software which, when executed by a computer, causes the computer to implement a wireless sensing method comprising: one or more sensor devices detecting an environmental attribute in the vicinity of that sensor device; wireless communication circuitry transmitting telemetry data from the one or more environment sensors; and Near Field Communications (NFC) circuitry receiving configuration data for the sensor device from an external device.

BRIEF DESCRIPTION OF THE DRAWINGS

Various embodiments of the invention will now be described in detail by way of example only with reference to the following drawings.

DETAILED DESCRIPTION

Figure 1:
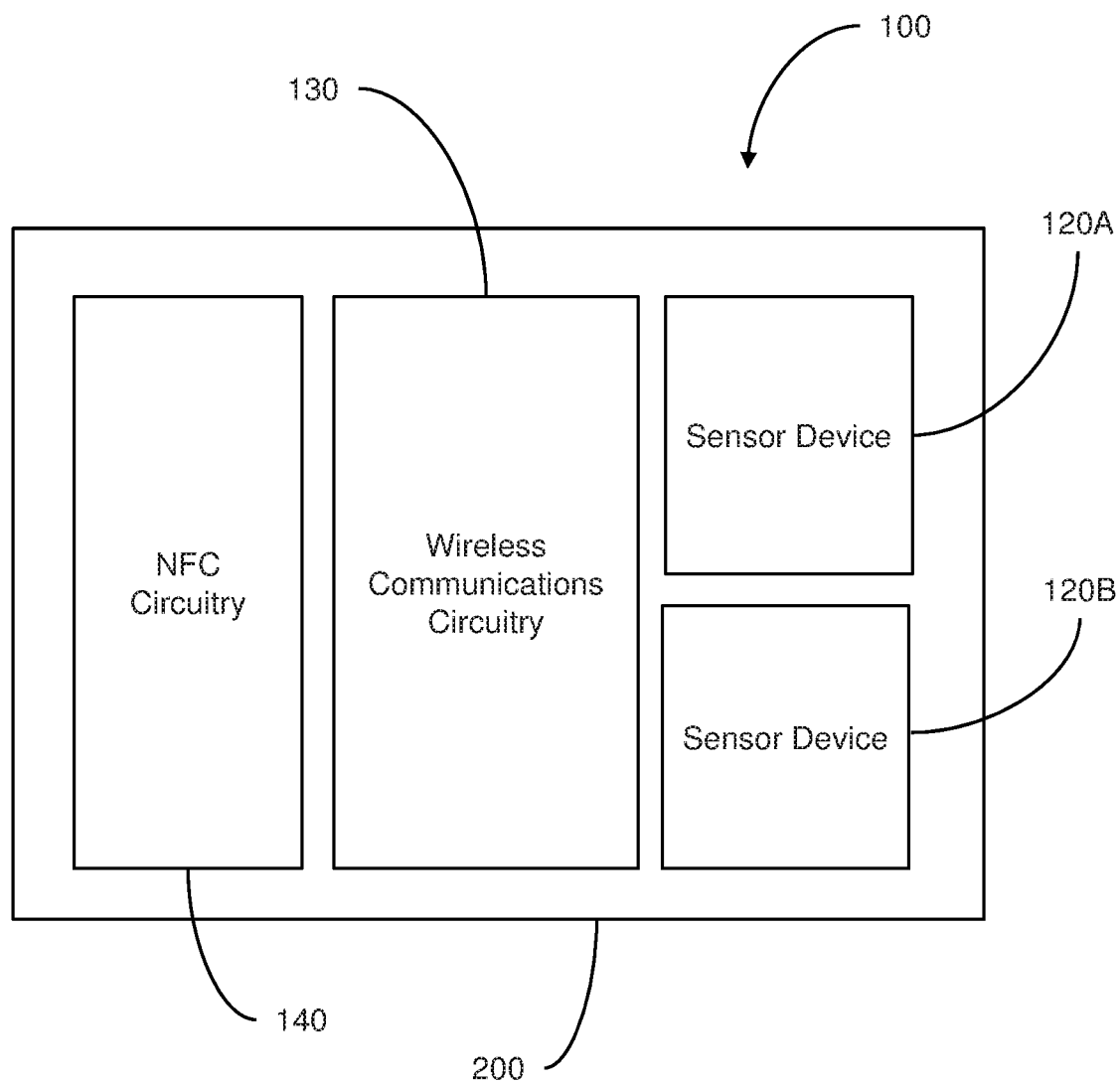
FIG. 1 is a schematic diagram of a wireless sensing apparatus in accordance with some example embodiments of the invention.

FIG. 1 is a schematic diagram of a wireless sensing apparatus 100 in accordance with some example embodiments of the invention. The wireless sensing apparatus comprises a housing 200, the housing 200 containing one or more sensor devices 120A, 120B, wireless communication circuitry 130 configured to transmit telemetry data from the one or more sensor devices 120A, 120B and Near Field Communications (NFC) circuitry 140 configured to receive configuration data for the wireless sensing apparatus from an external device. Such a wireless sensing apparatus is particularly suited for use in transport (e.g. rail) and/or construction applications.

Figure 2A:
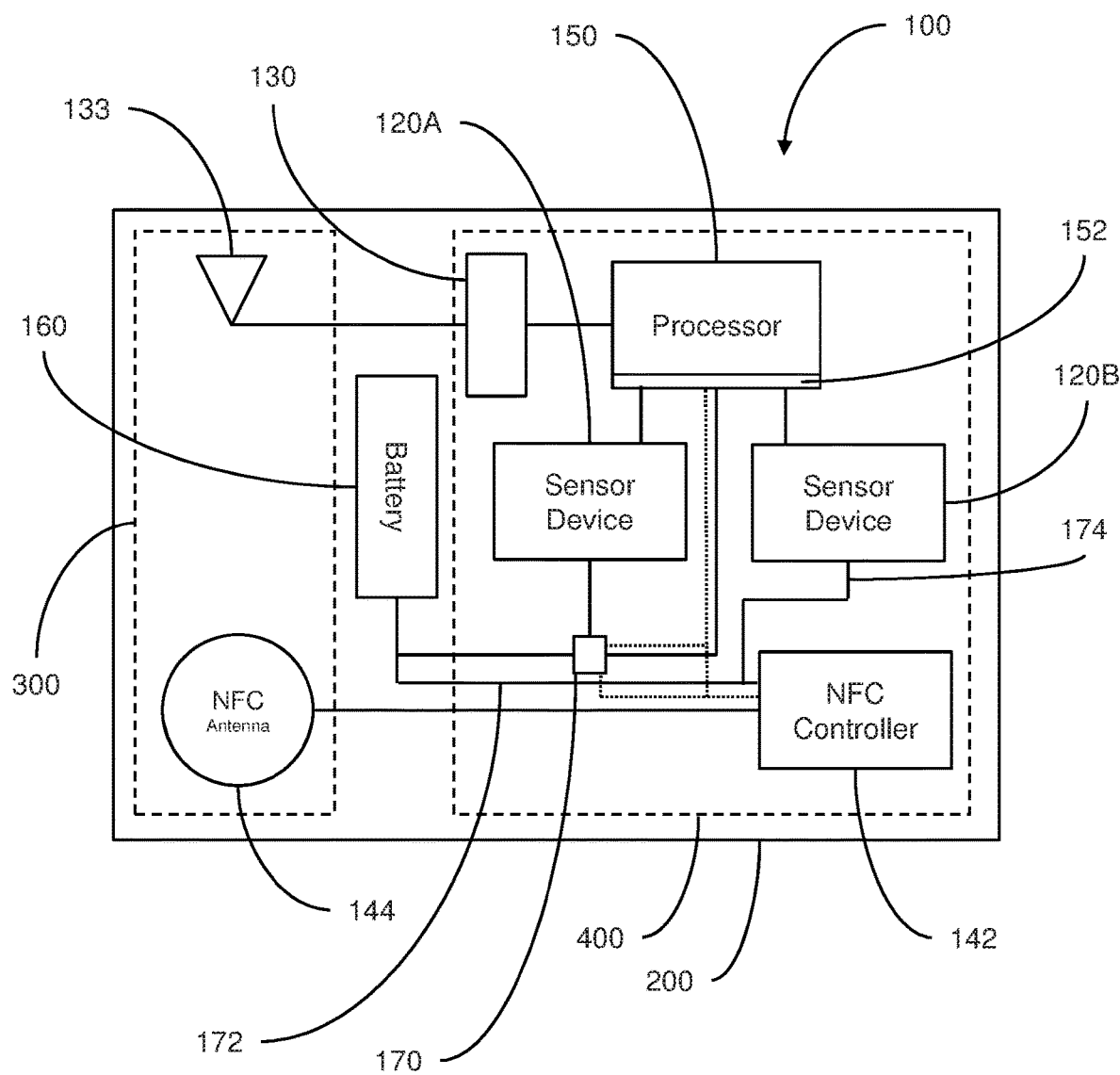
FIGS. 2A and 2B are more detailed schematic diagrams of a wireless sensing apparatus in accordance with some example embodiments of the invention.
Figure 2B:
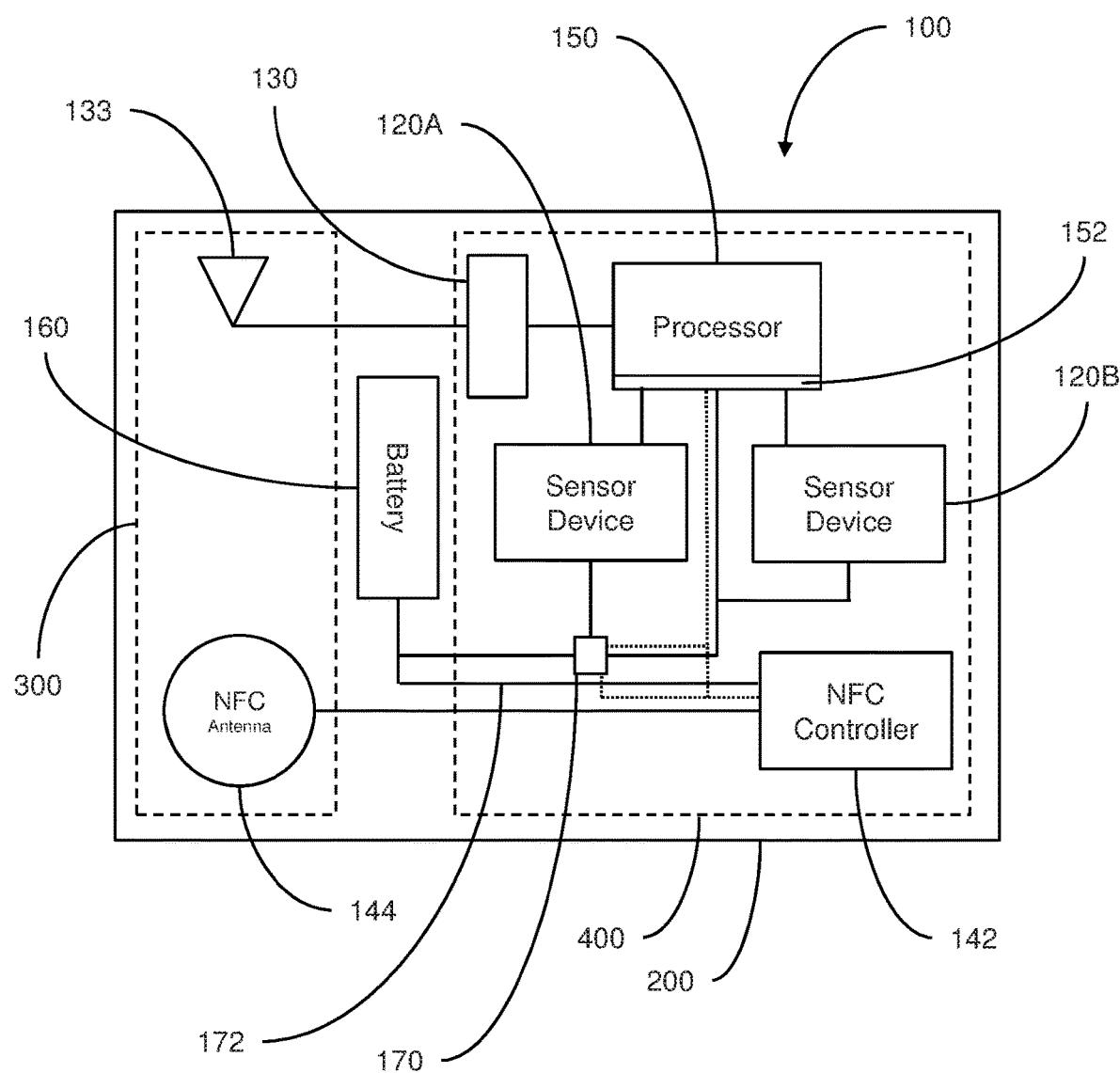

FIGS. 2A and 2B are more detailed schematic diagrams of the wireless sensing apparatus 100 illustrated in FIG. 1. The sensor devices 120A, 120B are each configured to detect an environmental attribute in the vicinity of that sensor device. The sensor devices 120A, 120B may comprise one or more selected from the list consisting of: (i) tilt sensors, wherein the environmental attribute is inclination, (ii) temperature sensors, wherein the environmental attribute is temperature, (iii) crack sensors, wherein the environmental attribute is a length of a crack, (iv) noise sensors, wherein the environmental attribute is sound, (v) pressure sensors, wherein the environmental attribute is pressure, (vi) light sensors, wherein the environmental attribute is light, (vii) radiation sensors, wherein the environmental attribute is radiation, (viii) vibration sensors, wherein the environmental attribute is vibration, (ix) air flow sensors, wherein the environmental attribute is airflow, (x) speed sensors, wherein the environmental attribute is speed, (xi) chemical sensors, wherein the environmental attribute is the presence of a given element or compound, (xii) current sensors, wherein the environmental attribute is electrical current, (xiii) voltage sensors, wherein the environmental attribute is electrical voltage, (xiv) position sensors, wherein the environmental attribute is the location in space of the sensor, (xv) displacement sensors, wherein the environmental attribute is movement, (xvi) torque sensors, wherein the environmental attribute is torque, (xvii) proximity sensors, wherein the environmental attribute is the presence of an object in the vicinity of the sensor, (xviii) force sensors, wherein the environmental attribute is force, and (xix) humidity sensors, wherein the environment attribute is relative humidity. For example, if the sensor devices are tilt sensors, the sensor devices may be an accelerometer or an electrolevel sensor, and may be fabricated, for example, as MEMS (micro-electro-mechanical system) sensor. One or more parts of a given sensor device may be outside the housing in order for the sensor to detect the environmental attribute. For example a temperature sensor may be contained within the housing 200 with a probe extending outside of the housing 200 or located remotely from the housing 200 in order for the temperature sensor to detect the temperature in the vicinity of the temperature device.

In some embodiments the sensor devices 120A, 120B are the same. For example, the sensor devices 120A, 120B are both tilt sensors. The sensor devices 120A, 120B may be the same in the sense that they detect the same environmental attribute, such as inclination for a tilt sensor, but the sensor devices 120A, 120B may be different models of sensor, have different detection ranges or polarities, different resolution or accuracy level, or may detect the same environmental parameter using a different method. For example, the sensor devices 120A, 120B may both be tilt sensors, but the sensor device 120A is an accelerometer whilst the sensor device 120B is an electrolevel sensor. Alternatively, the sensor devices 120A, 120B may detect different environmental attributes, for example sensor device 120A being a tilt sensor to detect inclination whilst sensor device 120B is a temperature sensor to detect temperature.

In some embodiments, the environmental attribute comprises an attribute of a structure, for example a tunnel or building, and the wireless sensing apparatus 100 comprises a fixing for attaching the housing to the surface of the structure. For example, the housing 200 may comprise one or more flanges through which screws, nails or other fastening means can be passed to fix the wireless sensing apparatus 100 to the surface of the structure. Alternatively or in addition, the housing 200 may have a substantially flat surface which may be adhered to the surface of the structure using an adhesive, such as glue or epoxy resin, or through magnetism.

The telemetry data from the sensor devices 120A, 120B is passed, for example, via an analogue-to-digital converter 152, to a processor unit 150, which is configured to control the operation of the wireless sensing apparatus. In other embodiments, the sensor devices 120A, 120B have a digital interface through which to pass telemetry data directly to the processor unit 150. The wireless sensing apparatus also includes wireless communication circuitry 130 including a wireless communications antenna 133 to allow the telemetry data from the sensor devices 120A, 120B to be communicated to a suitable destination, such as a wireless access point or another wireless sensing apparatus in a peer-to-peer communication mode, using a suitable wireless communications protocol, and likewise command instructions to be received into the wireless sensing apparatus 100. In some example embodiments, the wireless communication circuitry 130 may operate at a frequency of 2.4 GHz within the ISM (industry, scientific and medical) band in compliance with IEEE 802.15.4. The data rate is 250 kbits per second, with a typical duty cycle of 1%. The point-to-point range between one wireless sensing apparatus 100 and another wireless sensing apparatus (or a wireless access point) is generally tens of metres (and may be over 100 metres outdoors). It will be appreciated that other wireless sensing apparatus 100 may have different communication parameters according to the requirements and considerations of any particular implementation. The wireless communications circuitry 130 may also be integrated with the processor unit 150.

The wireless sensing apparatus 100 further includes a battery 160 configured to provide power to the various electrical components of the wireless sensing apparatus 100, such as the sensor devices 120A, 120B, the wireless communication circuitry 130 and the processor unit 150. The battery 160 may have sufficient capacity to allow for an operational lifetime measured in one or more years before recharging or replacement is required. Both the processor unit 150 and the battery 160 may also be contained within the housing 200.

The NFC circuitry 140 comprises an NFC controller 142 and an NFC antenna 144. The NFC controller 142 comprises memory and a processor. The NFC controller 142 is configured to cooperate with the processor unit 150 to control the operation of the wireless sensing apparatus. This allows the operation of the wireless sensing apparatus 100 to be altered whilst the wireless sensing apparatus 100 is installed on-site. For example, generic configuration data may be installed when the wireless sensing apparatus 100 is manufactured, or may be sent to the wireless sensing apparatus 100 via the NFC circuitry 140 by the manufacturer before it is sent to the site where it is to be installed. Generic configuration data may comprise parameters such as a sampling rate for the sensor devices 120A, 120B and a transmission frequency and period for the wireless communications circuitry.

Once the wireless sensing apparatus 100 is installed on-site, specific configuration data for the site or location where the wireless sensing apparatus 100 is installed can be sent to the wireless sensing apparatus via the NFC circuitry 140. Specific configuration data may comprise items or parameters such as one or more of: a new sampling rate for the sensor devices 120A, 120B, transmission frequency and period for the wireless communications circuitry 130, the installation date of the wireless sensing apparatus 100, an identity of the technician who installed the wireless sensing apparatus 100 and an asset number for the wireless sensing apparatus 100. If the wireless sensing apparatus 100 is not in use or uninstalled and placed in a warehouse or stockroom, generic configuration data may be sent to the wireless sensing apparatus 100 via the NFC circuitry 140. This also beneficially allows the wireless sensing apparatus 100 to be configured without opening or removing the housing 200. A further option is to use the wireless communications circuit 130 to transmit configuration data to the processor 150; the processor could then change stored parameters previously obtained via the NFC circuitry 140.

In some example embodiments, in response to receiving a signal from an external device, such as a mobile telephone, tablet or laptop computer, via the NFC antenna 144, the NFC controller 142 is configured to cooperate with the processor unit 150 to change the mode of operation of the wireless sensing apparatus 100, for example from a first mode of operation to a second mode of operation, for example by changing one or more of the parameters above. The wireless sensing apparatus 100 may be configured to operate in a normal operating mode, in which the wireless communication circuitry 130 and the sensor devices 120A, 120B are enabled.

In response to receiving a signal from an external device via the NFC antenna 144, the NFC controller 142 is configured to cooperate with the processor unit 150 to change the wireless sensing apparatus 100 from the normal operating mode to a low power mode, the low power mode having a lower power consumption than the normal operation mode. The low power mode may disable one or more components of the wireless sensing apparatus 100, for example the sensor devices 120A, 120B, and the wireless communications circuitry 130. When disabled, the sensor devices 120A, 120B will no longer detect an environmental attribute in the vicinity of that sensor device and the wireless communications circuitry 130 will no longer transmit or receive data. Accordingly, the current consumption of the wireless sensing apparatus 100 will be greatly reduced, for example to below 5 µA. This increases the life of the battery 160 and allows power consumption to be limited when detection of environmental attributes is not required, for example when the wireless sensing apparatus 100 is installed on-site but detection of environmental attributes is not required or when the wireless sensing apparatus 100 is not installed on-site and is instead stored in a warehouse or stockroom. The wireless sensing apparatus 100 may be configured in the low power mode when it is first manufactured and changed to the normal operating mode only once the wireless sensing apparatus 100 is installed in the location where environmental attributes are to be detected. The wireless sensing apparatus 100 may be installed on-site, and then a signal is sent from an external device via the NFC antenna 144 to the NFC controller 142 instructing the NFC controller 142 to change the wireless sensing apparatus 100 from the low power mode into the normal operating mode.

In some example embodiments, one of the sensor devices 120B has a lower operating current draw than the other sensor device 120A when in normal operation. For example sensor device 120B may have an operating current draw of around 6 µA whilst sensor device 120A may have an operating current draw of around 4 mA when in normal operation. Sensor device 120B may also have a lower sampling rate and/or a lower sampling resolution than sensor device 120A. Sensor device 120B may be configured to remain enabled when the wireless sensing apparatus 100 is configured in the lower power mode, whilst sensor device 120A and the wireless communication circuitry 130 are disabled when the wireless sensing apparatus 100 is in the low power mode. This reduces the overall current draw of the wireless sensing apparatus 100, but also allows telemetry data from the sensor device 120B to be sensed. The NFC controller 142 may be configured to store telemetry data from the sensor device 120B in the memory of the NFC controller 142 when the wireless sensing apparatus 100 is configured in the lower power mode. This telemetry data may be stored in the memory of the NFC controller 142 until the wireless sensing apparatus 100 is next configured in the normal operating mode, when it can be transmitted via the wireless communication circuitry.

In some embodiments the wireless sensing apparatus 100 is configured to change from the low power mode to the normal operating mode in response to sensor device 120B making a detection indicative of one or both of: a change of at least a predetermined magnitude in the environmental attribute detected by the sensor device 120B, and a predetermined attribute value of the environmental attribute detected by the sensor device 120B. For example if the sensor device 120B is a tilt sensor, the wireless sensing apparatus may be configured to change from the low power mode to the normal operating mode in response to the tilt sensor detecting a tilt angle of greater than 45° (relative to a reference angle such as vertical) or a change in tilt angle of greater than 2°. Alternatively, if the sensor device 120B is a temperature sensor, the wireless sensing apparatus may be configured to change from the low power mode to the normal operating mode in response to the temperature sensor detecting a temperature of greater than 25° C. or a change in temperature of greater than 2° C. In the normal operating mode, the sensor device 120A and the wireless communications circuitry 130 are also enabled. This results in the second sensor device 120A only being activated in response to the other sensor device 120B making a detection, thereby helping to improve the life of battery 160 by limiting larger scale power consumption only to periods when telemetry data is are required.

In some example embodiments, the wireless sensing apparatus 100 comprises power control circuitry 170 configured to enable and disable the wireless communication circuitry 130 and the one or more sensor devices 120A, 120B by selectively providing power to that component.

When the wireless sensing apparatus 100 is operating in the normal operating mode, the power control circuitry 170 is configured, under the control of the processor unit, to initiate a move from the normal operation mode to the low power mode. As illustrated in FIG. 2A, to move from the normal operation mode to the low power mode, the power control circuitry 170 is set to OFF. Current from the battery is still able pass to the NFC controller along the current path 172 and to the sensor device 120B along current line 174, and to the processor 150, thereby allowing these components to stay enabled (although the processor may be in a sleep mode). With the power control circuitry set to OFF, the configuration of the operating mode of the wireless sensing apparatus 100 corresponds to a low power mode wherein one of the sensor devices 120B is still enabled. (Note that the NFC antenna and controller may be powered either by the battery, or by receiving power from an external reader).

As illustrated in FIG. 2A, to move from the low power mode to the normal operation mode, the power control circuitry 170 is set to ON, allowing current from the battery to pass to the sensor device 120A, the processor 150 and the wireless communication circuitry 130, thereby enabling these components. Current from the battery is still able pass to the NFC controller along the current path 172 and to the sensor device 120B along current line 174, thereby allowing these components to stay enabled. With the power control circuitry set to ON, the configuration of the operating mode of the wireless sensing apparatus 100 corresponds to the normal operating mode.

FIG. 2B illustrates some alternative embodiments of wireless sensing apparatus 100 illustrated in FIG. 2A, with like reference signs referring to the same components and operation as described above in respect of FIG. 2A. In the embodiments illustrated in FIG. 2B, to move from the normal operation mode to the low power mode, the power control circuitry 170 is again set to OFF. With the power control circuitry set to OFF, the configuration of the operating mode of the wireless sensing apparatus 100 corresponds to a low power mode wherein none of the sensor devices 120A, 120B are enabled.

In the embodiments illustrated in FIG. 2B, to move from the low power mode to the normal operation mode, the power control circuitry 170 is set to ON, allowing current from the battery to pass to both the sensor device 120A and the sensor device 120B, the processor 150 and the wireless communication circuitry 130, thereby enabling these components. Current from the battery is still able pass to the NFC controller along the current path 172, thereby allowing these components to stay enabled. With the power control circuitry set to ON, as described above with respect to FIG. 2A, the configuration of the operating mode of the wireless sensing apparatus 100 corresponds to the normal operating mode.

In some example embodiments, the memory of the NFC controller 142 is configured to store data from components of the wireless sensing apparatus 100, such as a most recent sample of the environmental attribute from the one or more of the sensor devices 120A, 120B, the general and/or specific configuration data for the wireless sensing apparatus 100, identification information for the wireless sensing apparatus 100 and a most recent detection of the state of the battery 160, such as the amount of charge remaining on the battery at a given timestamp. The NFC controller 142 is configured to transmit, via the NFC antenna 144, data stored in the memory of the NFC controller 142 to an external device in response to a request from the external device. This data can then be used to assist with troubleshooting and diagnostic analysis in the event of the wireless sensing apparatus 100 being faulty. For example, if no data is received from the wireless sensing apparatus 100 via the wireless communications circuitry 130, a technician can retrieve the data stored in the memory of the NFC controller 142 via the NFC antenna 144 in order to determine the cause of problem, such as the wireless sensing apparatus 100 having been placed into low power mode accidently, the incorrect configuration data having been installed on the wireless sensing apparatus 100 or the battery 160 having low charge. The technician can then send a signal to the NFC controller 142 via the NFC antenna 144 to fix the problem without necessarily having to remove the wireless sensing apparatus 100 from its installed location. If the fault is due to the battery 160 having low charge, the wireless sensing apparatus 100 may be removed and replaced with a different unit. The technician may be provided with software compatible with the wireless sensing apparatus 100 to be installed on the external device to assist in configuring and diagnostic analysis of the wireless sensing apparatus 100. The most recent sample of the environmental attribute from the sensor devices 120A, 120B can also be retrieved via the NFC circuitry 140 to calibrate the wireless sensing apparatus 100. In some example embodiments, the NFC circuitry 140 is configured draw power from the external device via the NFC antenna, such as through an induction loop antenna. In these embodiments, since the NFC circuitry 140 does not require the battery 160 in order to function, the data stored on the memory of the NFC controller 142 can be retrieved even when the battery 160 has been depleted. This allows the configuration data for the wireless sensing apparatus 100 to be retrieved and copied, by the external device onto the replacement unit, thereby potentially speeding up the overhaul process.

In some example embodiments the sensor devices 120A, 120B, the processor unit 150, the wireless communications circuitry 130 and the NFC controller 142 are disposed on a first printed circuit board (PCB) assembly 400. The wireless communications antenna 133 and the NFC antenna 144 are disposed on a second PCB assembly 300. The battery 160 may be disposed between the first PCB assembly 400 and the second PCB assembly 300, for example by soldering the battery 160 onto the second PCB assembly 300. The NFC antenna 144 and the battery 160 are connected to the first PCB assembly 400 by a flexible printed circuit board (FPC) or a small board-to-wire wiring harness whilst the wireless communications antenna 133 is connected to the wireless communications circuitry 130 on the first PCB assembly 400 by a Radio Frequency (RF) cable.

Figure 3:
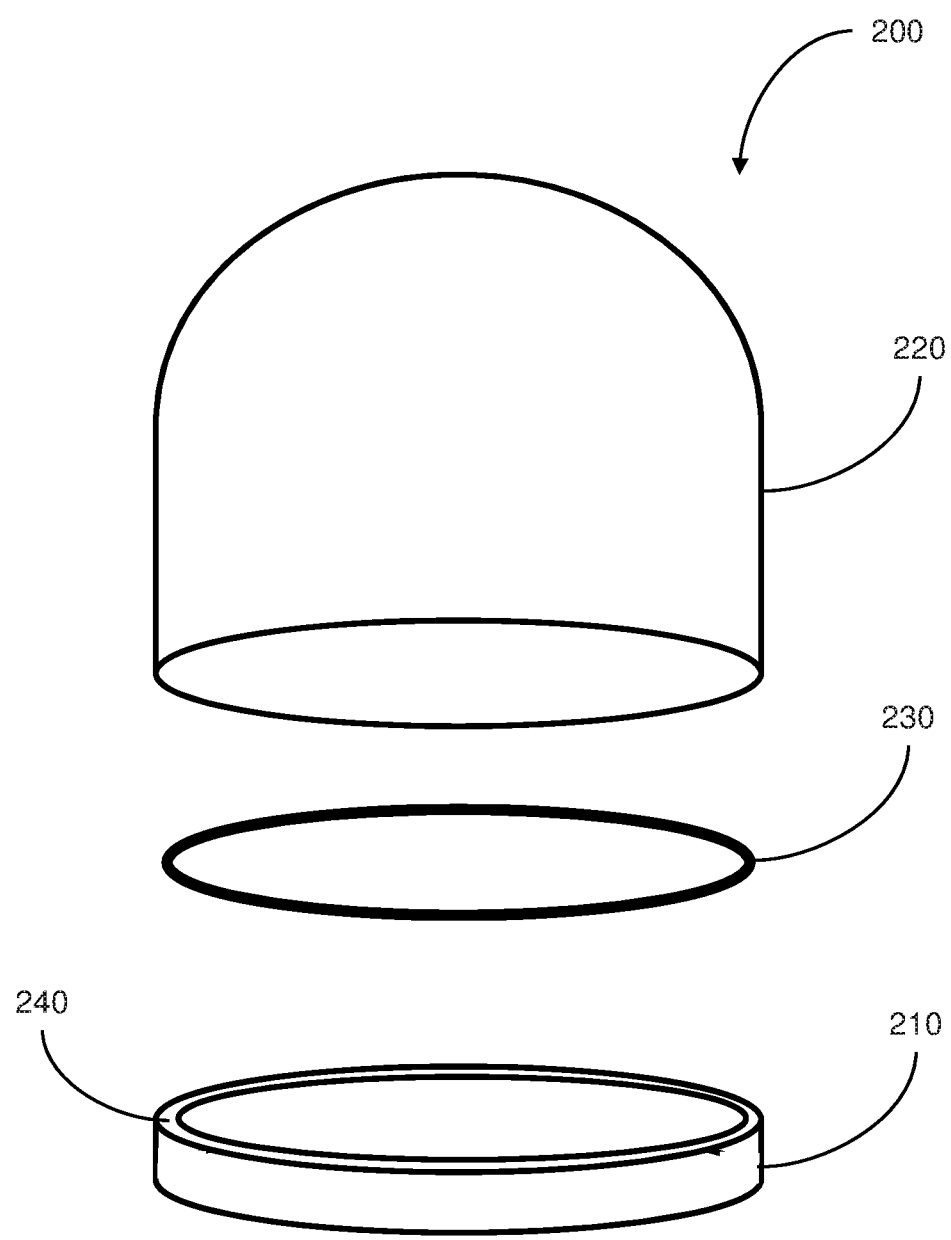
FIG. 3 is an exploded view of a housing for a wireless sensing apparatus in accordance with some example embodiments of the invention.

FIG. 3 illustrates an exploded view of a housing 200 for a wireless sensing apparatus in accordance with some example embodiments of the invention. The housing 200 comprises a metallic base 210, a plastics cap 220 fixed to the metallic base 210 and an O-ring 230 disposed between the metallic base 210 and the plastics cap 220.

The metallic base 210 may be formed from aluminium or any other suitable metallic material by conventional machining methods such as turning or milling. The metallic base 210 provides a rigid mount for the components of the wireless sensing apparatus 100 to ensure that stable and repeatable environmental attribute detection is achieved. The metallic base 210 may also include fastening means such as screw holes or brackets for attaching the housing 200 to a mounting plate or bracket or to a structure. The metallic base 210 may comprise one or more flanges through which screws, nails or other fastening means can be passed to fix the wireless sensing apparatus 100 to a structure. Alternatively or in addition, the metallic base 210 may have a substantially flat surface which may be adhered to the surface of the structure using an adhesive, such as glue or epoxy resin, or through the use of permanent magnets fixed to the metallic base 210, such as by screws, glue or another suitable fixing means.

The plastics cap 220 is formed into a convex curvature to provide a resilient layer. The plastics cap may be formed into a dome shape, as illustrated in FIG. 3, or another shape, for example a conical shape. The plastics cap 220 may be formed of a polycarbonate material, for example an ultraviolet stabilised polycarbonate material, or any other thermoplastics material. The plastics cap 220 may be manufactured by conventional plastics forming techniques, for example turning, injection moulding or vacuum forming. The plastics cap 220 may be fixed to the metallic base 210 by a press fit snap joint. This prevents the plastics cap 220 from rotating relative to the metallic base 210. The press fit snap joint also prevents accidental removal of the plastics cap 220 from the metallic base 210 as the press fit snap joint is permanently broken when the plastics cap 220 is removed from the metallic base 210, preventing the plastics cap 220 from being reattached to the metallic base 210. This also provides a tamper evident seal for the housing 200. In some example embodiments, no components of the wireless sensing apparatus are fixed to the plastics cap 220 so that the plastics cap 220 is able to deform and withstand impact without necessarily damaging components of the wireless sensing apparatus. In some embodiments, the plastics cap 220 is provide with one or more holes to allow the sensor devices 120A, 120B to detect environmental attributes in the vicinity of the wireless sensing apparatus, for example temperature, humidity or radiation. The plastics cap 220 provides impact protection from, for example, a steel toe capped boot or an accidental hammer blow. The plastics cap 220 may be opaque or translucent and available in a variety of colours depending on the application of the wireless sensing apparatus 100. Markings may be printed on the outside of the plastics cap 220, for example a media access control (MAC) address of the wireless communication circuitry, a location identifier, an orientation marking, or a brand or regulatory information. These markings can assist the user in identifying and using the housing 200 and the wireless sensing apparatus 100.

An O-ring 230 is disposed between the metallic base 210 and the plastics cap 220 to provide a water-resistant seal for the components of the wireless sensing apparatus 100 contained in the housing 200. The O-ring 230 is located within a gasket tray 240 on the metallic base 210 and combines with the press fit snap joint between the metallic base 210 and the plastics cap 220 to provide a pneumatic and hydraulic seal for the components of the wireless sensing apparatus 100 contained within the housing 200.

Different sizes of housing 200 may be used depending on the size of the components of the wireless sensing apparatus 100 to be housed. For example, a small, medium and large version of the housing 200 may be available. Different manufacturing methods may be employed for the different versions of the housing 200 in order to produce a cost-effective housing 200. For example the plastic cap 220 of the smallest version may be manufactured by turning whilst the plastic cap 220 for larger versions may be manufactured by injection moulding.

The sensing apparatus 100 is particularly suited for use in transport (e.g. rail) and/or construction applications. Such usage generally involves an outdoor location, which is often exposed to adverse elements including weather (rain, ice, wind, temperature variation etc) and other potential contaminants (e.g. dirt and dust). Accordingly, the housing 200 provides a robust exterior for the sensing apparatus 100 that helps to forming a robust, sealed environment for the sensing apparatus in order to maintain the integrity of the sensing apparatus 100 and to protect against such adverse elements. In addition, the absence of any external wired connectivity for the sensing apparatus 100 through the housing 200 limits the risk of accidental or deliberate electrical attack—such as a lightning strike, electrostatic discharge (ESD), and so on.

The housing 200 and sealed environment thereby created are also designed to be tamperproof. This is particularly important for the security of sensors having an exposed location, for example, to protect any IP address and/or network keys held within (and utilised by) the sensing apparatus from being compromised, and also to help reduce the risk of product cloning. This is supported by the NFC circuitry 140 and antenna 144 enabling communications with the internals of the sensor apparatus 100 without having to open the plastic housing 200, thereby allowing the tamperproof seal to remain intact.

Figure 4:
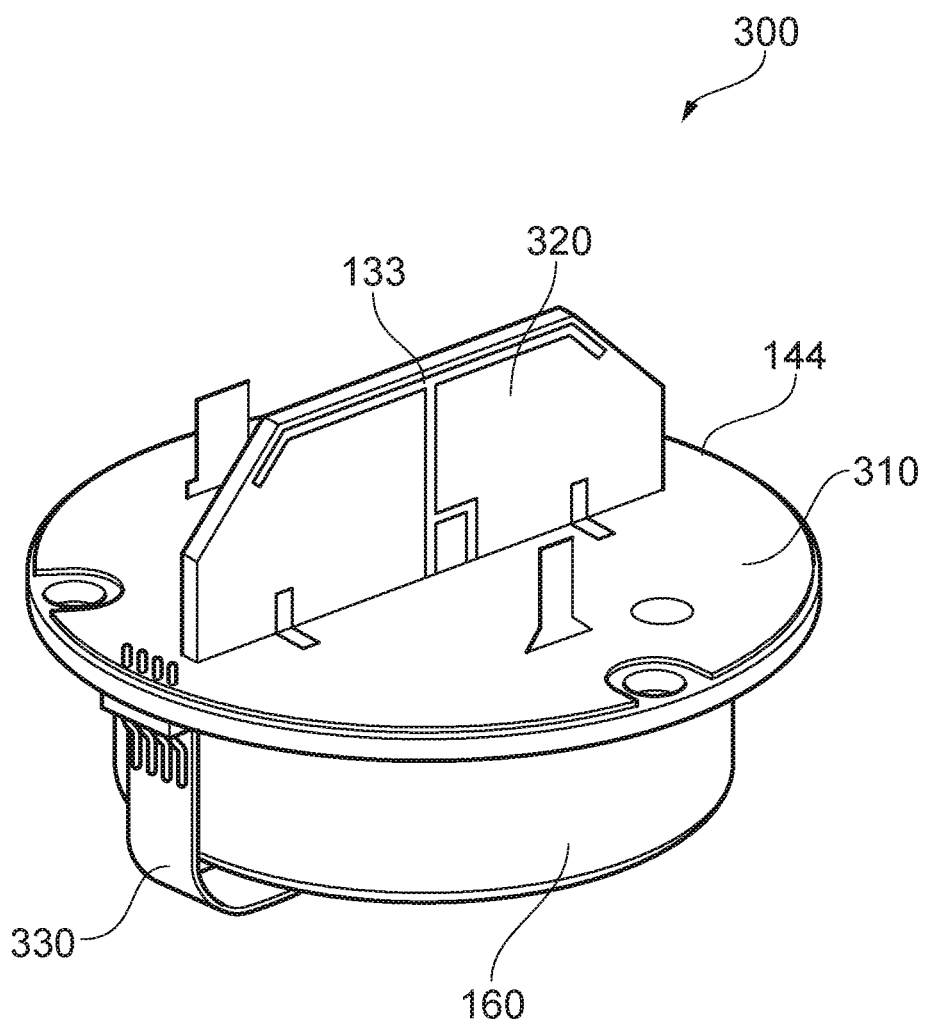
FIG. 4 is a schematic diagram of a second PCB assembly for the wireless sensing apparatus in accordance with some example embodiments of the invention.

The housing 200 is also arranged to provide a high level of dimensional stability, for example, in the presence of sunlight, humidity, and/or temperature variation. This is especially important for implementations in which the sensing apparatus 100 includes one or more high precision tilt sensors (so that the accuracy of the measurements from such a sensor are not adversely affected by distortion of the housing 200 itself). Figure 4 illustrates a second PCB assembly 300 for the wireless sensing 100 in accordance with some example embodiments of the invention. In some example embodiments, the first PCB assembly 400 is mounted to the metallic base 210 of the housing 200. The battery 160 is then mounted (e.g. soldered) on a first side of the second PCB assembly 300 with the NFC antenna 144 and wireless communications circuitry 130 mounted on a second side of the second PCB assembly 300 opposite the first side. The second PCB assembly 300 is then mounted on the first PCB assembly 400, such that the battery 160 is disposed between the first PCB assembly 400 and the second PCB assembly 300. The NFC antenna 144 and battery 160 are connected to the first PCB assembly 400 by an FCB 330 whilst the wireless communications antenna 133 is connected to the wireless communications circuitry 130 on the first PCB assembly 400 by an RF cable. The second PCB assembly 300 is formed of two interconnected PCBs: a base PCB 310 and an antenna PCB 320. The base PCB 310 and the antenna PCB 320 are mounted perpendicular to one another. The base PCB 310 acts as a ground plane for the wireless communications antenna 133, which is printed on the antenna PCB. The NFC antenna 144 comprises an inductor coil which is disposed around the periphery of the base PCB 310 such that it runs around the outer edge of the base PCB 310. The second PCB assembly 300 may be constructed from glass-reinforced epoxy laminate or other suitable material and is typically 0.8-1.6 mm thick. The base PCB 310 of the second PCB 300 may be circular in shape or any other suitable geometry. The base PCB 310 has a cross section smaller than that of the plastics cap 220 so that it can be easily fitted inside the housing 200. A tuning capacitor for the NFC antenna may be mounted on the FPC 330 or board-to-wire wiring harness or on the base PCB 310.

Different sizes of components of the wireless sensing apparatus 100 may be used in conjunction with the different sizes of housing 200. For example, a common size of first PCB assembly 400 may be used for all the wireless sensing apparatuses 100 whilst different sizes of battery 160 and second PCB assembly 300 may be used to fabricate different sizes of wireless sensing apparatuses 100 depending on the application. The different sizes of wireless sensing apparatus 100 may then be housed in different sizes of housing 200 in order to create the most compact wireless sensing apparatus 100 and housing 200 possible for a given application.

Figure 5:
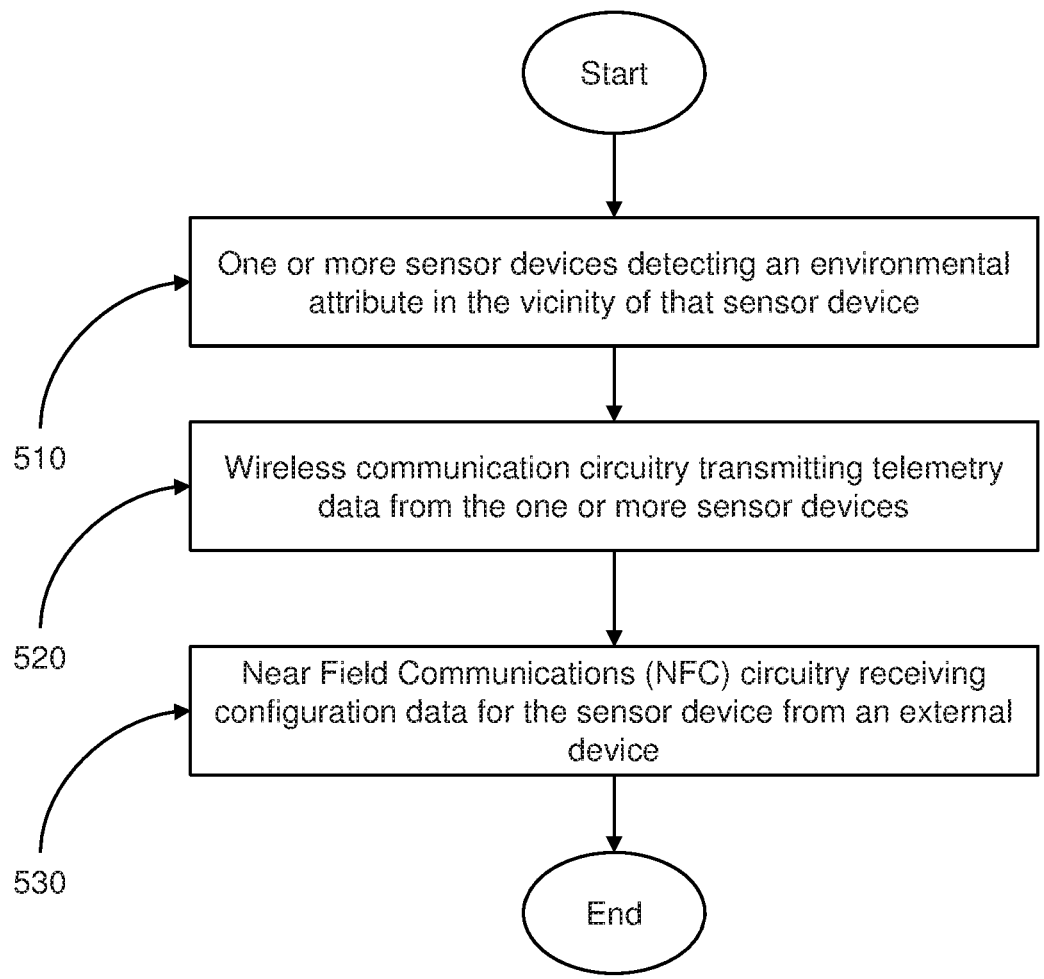
FIG. 5 is a flow diagram of a wireless sensing method in accordance with some example embodiments of the invention.

FIG. 5 is a flow diagram of a wireless sensing method 500 in accordance with some example embodiments of the invention. One or more sensor devices 120A, 120B detect an environmental attribute in the vicinity of that sensor device (see step 510). The wireless communication circuitry 130 and wireless communications antenna 133 transmit telemetry data from the one or more sensor devices 120A, 120B (see step 520). Near Field Communications (NFC) circuitry 140 receives configuration data for the wireless sensing apparatus 100 from an external device (see step 520).

In some example embodiments computer software is provided which, when executed by a computer, causes the computer to implement the wireless sensing method 500. A computer readable storage medium may also be provided for storing the computer software. The computer readable storage medium may be non-transitory. A computer program product may also be provided for controlling a computer to perform the wireless sensing method.

In conclusion, various embodiments of the invention have been described. The skilled person will appreciate that these embodiments are provided only by way of example, and different features from different embodiments can be combined as appropriate. Furthermore, the details of a wireless sensing apparatus and wireless sensing method will depend upon the particular environment in which the apparatus is installed or the method is used, and the intended application of both the apparatus and the method. Accordingly, the scope of the presently claimed invention is to be defined by the appended claims and their equivalents.

What is claimed is:

1. A wireless sensing apparatus, comprising:
a housing containing:
one or more sensor devices each configured to detect an environmental attribute in a vicinity of that sensor device;
wireless communication circuitry configured to transmit telemetry data from the one or more sensor devices, the wireless communication circuitry comprising a wireless communication antenna;
Near Field Communications (NFC) circuitry configured to receive configuration data for the wireless sensing apparatus from an external device, wherein the NFC circuitry comprises: an NFC controller comprising a memory and a processor, and an NFC antenna;
a processor unit configured to control operation of the wireless sensing apparatus; and
a battery configured to provide power to at least the one or more sensor devices, the wireless communication circuitry, and the processor unit;
wherein the one or more sensor devices, the processor unit, at least some of the wireless communication circuitry, and the NFC controller are disposed on a first Printed Circuit Board (PCB) assembly; and
wherein the wireless communication antenna and the NFC antenna are disposed on a second PCB assembly.

2. The wireless sensing apparatus of claim 1, wherein the memory of the NFC controller is configured to store data representing one or more of:
a most recent sample of at least one environmental attribute from the one or more at least two sensor devices;
the configuration data for the wireless sensing apparatus;
identification information for the wireless sensing apparatus;
a most recent detection of a state of the battery.

3. The wireless sensing apparatus of claim 1, wherein the battery is disposed between the first and second PCB assemblies.

4. The wireless sensing apparatus of claim 1, wherein the second PCB assembly is formed of two interconnected PCBs mounted perpendicular to each other and further wherein one of the interconnected PCBs forming the second PCB assembly provides a ground plane for the wireless communication antenna of the wireless communication circuitry.

5. The wireless sensing apparatus of claim 4, wherein the NFC antenna comprises an induction coil disposed around a periphery of the one of the interconnected PCBs which provides the ground plane for the wireless communication antenna.

6. The wireless sensing apparatus of claim 1, wherein:
the environmental attribute comprises an attribute of a structure; and
the wireless sensing apparatus comprises a fixing for attaching the housing to a surface of the structure.

7. The wireless sensing apparatus of claim 1, wherein the wireless sensing apparatus is adapted for fastening to a civil engineering structure for monitoring.

8. The wireless sensing apparatus of claim 1, wherein the housing comprises a cap and a base which are attached to one another by a press fit snap joint, wherein the press fit snap joint is permanently broken if the cap is removed from the base to prevent the cap from being reattached to the base, thereby acting as a tamper-evident seal for the housing.

9. The wireless sensing apparatus of claim 1, wherein the housing provides a tamperproof and sealed environment.

10. The wireless sensing apparatus of claim 1, wherein the housing contains:
at least two sensor devices, each sensor device configured to detect the environmental attribute in a vicinity of that sensor device, wherein:
the at least two sensor devices are configured to detect a same environmental attribute,
the environmental attribute is inclination, and
the at least two sensor devices are tilt sensors;
wherein in response to receiving a signal from the external device via the NFC antenna, the NFC controller is configured to cooperate with the processor unit to change the wireless sensing apparatus from a first mode of operation to a second mode of operation, wherein one of the first or the second mode of operation is a normal operation mode in which the wireless communication circuitry and the at least two sensor devices are enabled, and the other of the first or the second mode of operation is a low power mode, the low power mode having a lower power consumption than the normal operation mode, wherein:
a first one of the at least two sensor devices has a lower operating current draw than a second one of the at least two sensor devices,
the first one of the at least two sensor devices is configured to remain enabled when the wireless sensing apparatus is configured in the low power mode, and
the wireless communication circuitry and the second one of the at least two sensor devices are disabled when the wireless sensing apparatus is in the low power mode;
wherein the wireless sensing apparatus is configured to change from the low power mode to the normal operating mode in response to the first one of the at least two sensor devices making a detection indicative of one or both of:
a change of at least a predetermined magnitude in the environmental attribute detected by the first one of the at least two sensor devices; and
a predetermined attribute value of the environmental attribute detected by the first one of the at least two sensor devices.

11. The wireless sensing apparatus of claim 10, wherein one or more sensor devices of the at least two sensor devices, and the wireless communication circuitry, are disabled when the wireless sensing apparatus is in the low power mode.

12. A wireless sensing method comprising:
detecting, using one or more sensor devices, an environmental attribute in a vicinity of that sensor devices;
transmitting, using wireless communication circuitry, telemetry data from the one or more sensor devices;
receiving, via Near Field Communications (NFC) circuitry, configuration data from an external device;
wherein a housing contains:
the one or more sensor devices;
the wireless communication circuitry, the wireless communication circuitry comprising a wireless communication antenna;

the NFC circuitry, wherein the NFC circuitry comprises: an NFC controller comprising a memory and a processor, and an NFC antenna;

a processor unit configured to control operation of a wireless sensing apparatus; and a battery configured to provide power to at least the one or more sensor devices, the wireless communication circuitry, and the processor unit;

wherein the one or more sensor devices, the processor unit, at least some of the wireless communication circuitry, and the NFC controller are disposed on a first Printed Circuit Board (PCB) assembly; and wherein the wireless communication antenna and the NFC antenna are disposed on a second PCB assembly.

13. The method of claim 12, wherein the one or more sensor devices comprise at least two sensor devices, wherein in response to receiving a signal from the external device via the NFC antenna, the NFC controller is configured to cooperate with the processor unit to change the wireless sensing apparatus from a first mode of operation to a second mode of operation, wherein one of the first or the second mode of operation is a normal operation mode in which the wireless communication circuitry and the at least two sensor devices are enabled, and the other of the first or the second mode of operation is a low power mode, the low power mode having a lower power consumption than the normal operation mode, wherein:

a first one of the at least two sensor devices has a lower operating current draw than a second one of the at least two sensor devices;

the first one of the at least two sensor devices is configured to remain enabled when the wireless sensing apparatus is configured in the low power mode; and the wireless communication circuitry and the second one of the at least two sensor devices are disabled when the wireless sensing apparatus is in the low power mode;

wherein the wireless sensing apparatus is configured to change from the low power mode to the normal operating mode in response to the first one of the at least two sensor devices making a detection indicative of one or both of:

a change of at least a predetermined magnitude in the environmental attribute detected by the first one of the at least two sensor devices; and a predetermined attribute value of the environmental attribute detected by the first one of the at least two sensor devices.

14. A device comprising:

at least one computer storage that is not a transitory signal and that comprises instructions executable by at least one processor for:

detecting, using one or more sensor devices, an environmental attribute in a vicinity of that sensor device;

transmitting, using wireless communication circuitry, telemetry data from the one or more sensor devices;

receiving, via Near Field Communications (NFC) circuitry, configuration data from an external device; wherein a housing contains:

the one or more sensor devices;

the wireless communication circuitry, the wireless communication circuitry comprising a wireless communication antenna;

the NFC circuitry, wherein the NFC circuitry comprises: an NFC controller comprising a memory and a processor, and an NFC antenna;

a processor unit configured to control operation of a wireless sensing apparatus; and a battery configured to provide power to at least the one or more sensor devices, the wireless communication circuitry, and the processor unit;

wherein the one or more sensor devices, the processor unit, at least some of the wireless communication circuitry, and the NFC controller are disposed on a first Printed Circuit Board (PCB) assembly; and wherein the wireless communication antenna and the NFC antenna are disposed on a second PCB assembly.

15. The device of claim 14, wherein the one or more sensor devices comprise at least two sensor devices, wherein in response to receiving a signal from the external device via the NFC antenna, the NFC controller is configured to cooperate with the processor unit to change the wireless sensing apparatus from a first mode of operation to a second mode of operation, wherein one of the first or the second mode of operation is a normal operation mode in which the wireless communication circuitry and the at least two sensor devices are enabled, and the other of the first or the second mode of operation is a low power mode, the low power mode having a lower power consumption than the normal operation mode, wherein:

a first one of the at least two sensor devices has a lower operating current draw than a second one of the at least two sensor devices;

the first one of the at least two sensor devices is configured to remain enabled when the wireless sensing apparatus is configured in the low power mode; and the wireless communication circuitry and the second one of the at least two sensor devices are disabled when the wireless sensing apparatus is in the low power mode;

wherein the wireless sensing apparatus is configured to change from the low power mode to the normal operating mode in response to the first one of the at least two sensor devices making a detection indicative of one or both of:

a change of at least a predetermined magnitude in the environmental attribute detected by the first one of the at least two sensor devices; and a predetermined attribute value of the environmental attribute detected by the first one of the at least two sensor devices.

* * * * *